United States Patent [19]

LeBlond et al.

[11] Patent Number: 4,672,846
[45] Date of Patent: Jun. 16, 1987

[54] MULTI-FUNCTION PRESSURE PROBE FOR AIRCRAFT

[75] Inventors: Henri LeBlond, Versailles; Louis Cabot, Paris, both of France

[73] Assignee: Badin Crouzet Aerodrom de Toussus-le-Noble, Chateaufort, France

[21] Appl. No.: 771,621

[22] Filed: Sep. 3, 1985

[30] Foreign Application Priority Data

Sep. 3, 1984 [FR] France .................... 84 13631

[51] Int. Cl.⁴ ............................................. G01C 21/00
[52] U.S. Cl. ......................................... 73/180; 73/189
[58] Field of Search ................... 73/180, 178 R, 188, 73/189

[56] References Cited

U.S. PATENT DOCUMENTS

| | | | |
|---|---|---|---|
| 2,662,402 | 12/1953 | Ince, Jr. et al. | 73/180 |
| 2,936,617 | 5/1960 | Beebe | 73/180 |
| 3,329,016 | 7/1967 | Leavens et al. | 73/180 |
| 3,343,412 | 9/1967 | Stout, Jr. | 73/180 |

FOREIGN PATENT DOCUMENTS

| | | |
|---|---|---|
| 2399027 | 2/1979 | France . |
| WO82/02944 | 9/1982 | PCT Int'l Appl. . |
| 1308080 | 2/1973 | United Kingdom . |
| 1484352 | 9/1977 | United Kingdom . |

Primary Examiner—Donald O. Woodiel
Attorney, Agent, or Firm—Stevens, Davis, Miller & Mosher

[57] ABSTRACT

Disclosed is an apparatus for measuring the aerodynamic parameters of an airflow around an aircraft. A streamlined body is rotatably mounted in the airflow such that it aligns itself freely with the flow. Total and static pressure pick-off apertures are provided in the body. The measurement of the true angle of incidence is obtained from two distinct measurements. A first measurement mechanically provides the orientation αm of the streamlined body relative to the aircraft and the other provides the aerodynamic pressure orientation αa of the same streamlined body relative to the airflow. The true angle of incidence α is then determined by summing αm and αa.

6 Claims, 2 Drawing Figures

MULTI-FUNCTION PRESSURE PROBE FOR AIRCRAFT

BACKGROUND OF THE INVENTION

Apparatus permitting the measurement of the aerodynamic parameters of a flow by means of a streamlined body orienting itself freely within the said flow and carrying total and static pressure pick-offs.

In the known apparatus of this type, such as those described in French Pat. Nos. 2 113 746 and 2 399 027, provision is made for mounting the pressure pick-off probe on a vane mounted on the cardan joint in such a way that, the probe remaining oriented within the flow, the perturbing influences due to variations in the angle of incidence are theoretically eliminated. In practice, the inertia of the vane and the resisting couples due to the articulated joints cause a situation in which the orientation of the probe is always to a greater or lesser extent displaced in relation to the sense of the flow. The result of this is that the measurement of the local angle of incidence $\alpha$, and by deduction that of the aircraft carrying the probe, which is obtained by a mechanical measurement, is not sufficiently accurate in relation to the characteristics of modern aircraft.

SUMMARY OF THE INVENTION

The object of the apparatus according to the invention is to eliminate the errors in the mechanical measurement of the angle of incidence $\alpha$. In order to do this, this measurement is corrected by a pneumatic measurement of the angle of incidence. The measurement of the angle of incidence $\alpha$ obtained in this manner is more accurate and more reliable than that of all the other known apparatus of this type; this applies equally in the subsonic range and in the supersonic range.

Accordingly, the value $\alpha$ of the angle of incidence is obtained from two distinct measurements:
- a measurement, by mechanical means, of the orientation $\alpha m$ of the streamlined body in relation to its support,
- a measurement, by pneumatic means, of the aerodynamic angle of incidence $\alpha a$ of the streamlined body within the flow, the true angle of incidence being defined by the relation $\alpha = \alpha m + \alpha a$. The streamlined body consists of a vane which is movable about an axis perpendicular to the surface of the carrier, that is to say to the fuselage of the aircraft, for example.

Its degree of freedom is of the order of $\pm 80°$, and the mechanical means giving the angular position $\alpha m$ of the vane consist of an angular position sensor, which is fixed directly on the shaft of the vane in order to avoid errors due to mechanical wear.

The pneumatic means permitting the aerodynamic angle of incidence $\alpha a$ to be obtained, consist of two pressure pick-offs disposed symmetrically on both sides of the leading edge of the movable vane. The measurement of the aerodynamic angle of incidence is obtained by the measurement of the differential pressure existing between these two pressure pick-offs.

BRIEF DESCRIPTION OF THE DRAWINGS

The accompanying drawing illustrates, by way of example, an embodiment of the apparatus in accordance with the present invention.

DETAILED DESCRIPTION OF PREFERRED EMBODIMENTS

Figure 1:
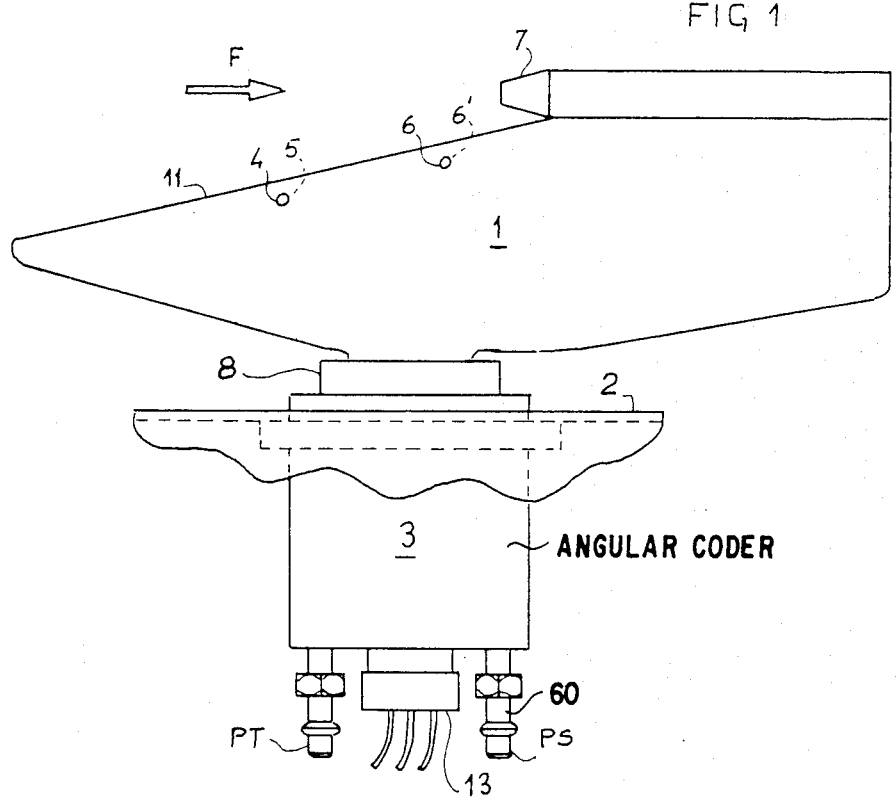
FIG. 1 is a side view of the apparatus.

As is shown, the apparatus consists of a vane 1 having the shape of a delta half wing which may be heated electrically in order to avoid the problems of icing. The rotation shaft 8 of the vane penetrates directly into a housing 3, in which it actuates an absolute optical coder (Code Gray) associated with an incremental relative coder. The resolution of the angular measurement $\alpha m$ is thus of the order of 0.03°.

The aerodynamic angle of incidence $\alpha a$ as seen by the vane 1 is measured with the aid of two pressure pick-offs 4 and 5 disposed symmetrically on the leading edge 11 of the vane, on the front surface and the rear surface.

These pick-offs deliver a differential pressure $\Delta p$ which is proportional to the aerodynamic angle of incidence $\alpha a$ of the vane 1 in the flow F. This pressure acts on a sensor 12, the accuracy grade of which is between $10^{-2}$ and $10^{-3}$ and which is capable of withstanding the severe conditions of the environment.

This sensor is accommodated within the shaft 8 of the vane. The electrical transmissions from the measurement electronics are transmitted along three flat wires which can operate in torsion in order to avoid the necessity of floating contacts, and which are connected to a socket arrangement 13.

In order to be able to use the apparatus regardless of what may be the speed of the flow, it is appropriate to know, in addition, the static pressure and the total or dynamic pressure.

In fact, the proportionality coefficient k, which defines the sensitivity of the measurement of pneumatic angle of incidence $\alpha a$, depends on these two parameters. These two data items are obtained with the aid of two pressure sensors 72 and 63 connected to the total and static pressure pick-offs of the apparatus respectively.

The total pressure pick-off 7 is of the Pitot tube type. It is fixed to the rear of the vane 1 on its upper part. The static pressure pick-off is formed by two air pick-offs 6 and 6' disposed on both sides of the leading edge 11 of the vane and in a symmetrical manner. These two air pick-offs 6 and 6' discharge into a common duct 60.

Advantageously, the static pressure pick-offs 6 and 6' are arranged to compensate for the perturbations of the local static pressure of the aircraft which are due to the angle of incidence and to the speed. This is achieved in a known manner by the choice of the shapes in such a manner that the static pressure induced by the circulation of the fluid around the probe compensates for the perturbation of the static pressure due to the aircraft; this takes place regardless of what may be the speed and the angle of incidence, both for the subsonic range and for the supersonic range.

Figure 2:
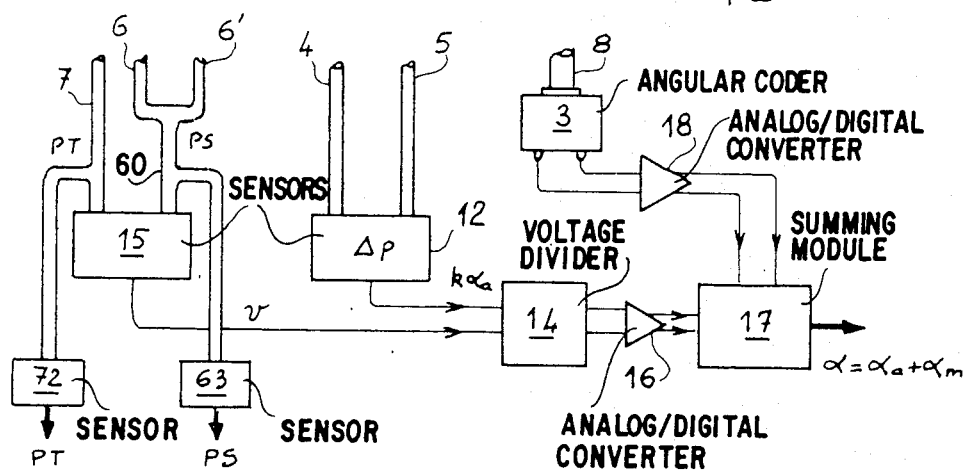
FIG. 2 is schematic diagram showing how the data $\alpha a$ and $\alpha m$ originating from the pneumatic means and from the mechanical means measuring the angle of incidence respectively, are processed.

The pressure signals sensed by the probe forming the subject of the invention are processed as shown in schematic form in FIG. 2. The differential pressure $\Delta p$ prevailing between the pressure pick-offs 4 and 5, which corresponds to $\Delta p = k\alpha a$, is obtained in the form of an electrical signal by means of a differential pressure sensor 12, which delivers a voltage proportional to $[k\alpha a]$.

Another relative pressure sensor 15 receives at the same time the total pressure $P_T$, which has come from the pick-off 7, and the static pressure resulting from the pressure pick-offs 6 and 6' connected to a common duct 60. This sensor delivers an electrical signal in the form of a voltage proportional to the aerodynamic speed v.

A voltage divider 14 normalises the signal [kαa] according to the speed v, as a function of which the coefficient k varies, and delivers a signal α a which is an analog signal, or preferably a digital signal through an analog/digital converter 16. This signal α a is fed to a summing electronic module 17, which likewise receives the signal α m, which has come from the angular coder 3, after digitalisation by an analog/digital converter 18. The signal from the summing module 17 represents the desired angle of incidence: $\alpha = \alpha a + \alpha m$.

The apparatus according to the invention permits the achievement to multi-function pressure probes for aircraft, the measurements of which are accurate and are not perturbed by the variations of speed and of angle of incidence.

We claim:

1. An apparatus for determining the incidence angle of an aircraft relative to an airflow around said aircraft comprising:

a streamlined body;

a means for mounting said body with one degree of freedom such that said body orients itself freely within said flow, said body including means for sampling total pressure of said flow and means for sampling static pressure of said flow;

a mechanical means for measuring an angle αm of said body relative to said aircraft;

a pneumatic means for measuring an angle αa of said body relative to said airflow; and a means for summing αm and αa and providing an output α indicative of said true angle of incidence of said aircraft relative to said airflow.

2. The apparatus according to claim 1, wherein said body comprises a vane, said mounting means comprising a rotatable shaft having an axis of rotation extending substantially perpendicular to a plane including αa and αm, means connecting said shaft to said vane and means connecting said shaft to said mechanical measuring means.

3. The apparatus according to claim 1, wherein said body comprises a vane having the leading edge with two sides and said pneumatic pressure measuring means comprises at least two pressure pick-offs, at least one pressure pick-off located on one side of said leading edge and at least one pressure pick-off located on said other side of said leading edge.

4. The apparatus according to claim 3, wherein said at least two pressure pick-offs are located symmetrically with respect to said leading edge.

5. The apparatus according to one of claims 1-4, wherein said static pressure sampling means and said body comprise a means for compensating said static pressure for perturbations in flow due to speed and angle of incidence of said airflow.

6. The apparatus according to claim 5, wherein said static pressure sampling means include at least two static pressure pick-offs.

* * * * *